F. F. TAYLOR.
CIRCULAR SAW.
No. 185,363. Patented Dec. 12, 1876.
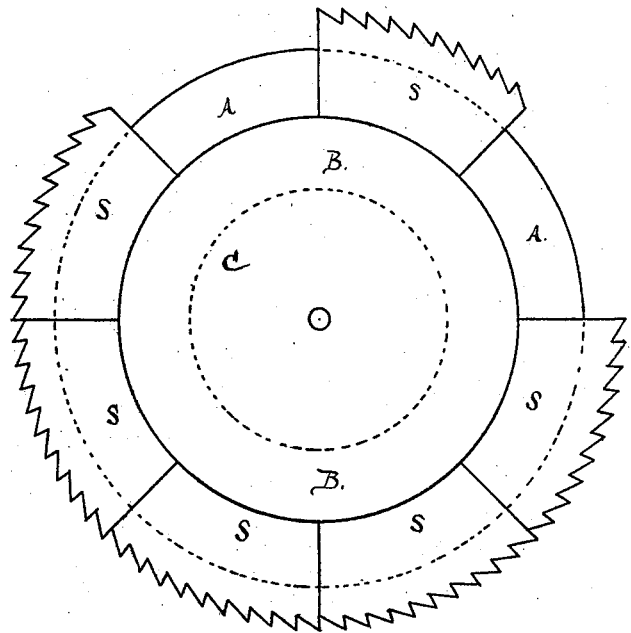
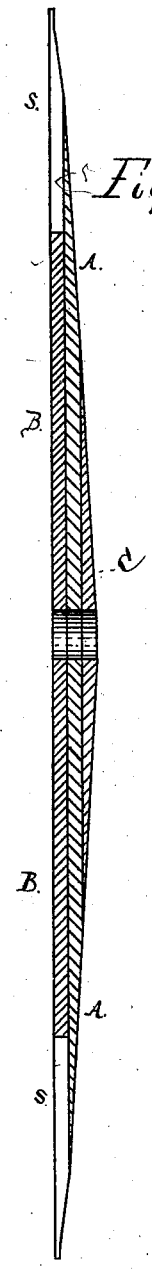
Witnesses.
Charles A. Renwick
E. Eugene Harkins
Inventor.
Fred F. Taylor.
By Taggart, Esmond & Fletcher
Attys.
THE GRAPHIC CO. N.Y.

UNITED STATES PATENT OFFICE.

FRED. F. TAYLOR, OF GRAND RAPIDS, MICHIGAN.

IMPROVEMENT IN CIRCULAR SAWS.

Specification forming part of Letters Patent No. 185,363, dated December 12, 1876; application filed September 18, 1876.

*To all whom it may concern:*

Be it known that I, FRED. F. TAYLOR, of the city of Grand Rapids, county of Kent, and State of Michigan, have invented an Improvement in Circular Saws for Cutting Lumber, of which the following is a specification:

The object of my invention is to construct a saw-flange of several steel plates (three being deemed most desirable) bolted together, so as to be firm and strong, and at the same time to be so thin as to enable it to be used in sawing lumber of various thicknesses.

The segments used upon my saw-flange are similar to those in general use, having parallel holes in them, so they can be set out when filed away, and being beveled toward the teeth, so that the width of the cutting-surface will be about three thirty-seconds of an inch, and by means of a saw constructed in accordance with the directions hereinafter given a very thin saw-kerf is taken out in sawing lumber, and thereby a considerable saving of material is made.

The construction of my invention is sufficiently shown in Figures 1 and 2 of the drawings accompanying these specifications.

Fig. 1 is a face view of my invention with two of the segments removed, and Fig. 2 is a sectional view taken through the center.

In constructing my improved flange I use three plates of steel—one shown by A, a smaller one by B, and one still smaller by C, in Fig. 1 by the dotted circle. Each of these plates is to be three-sixteenths of an inch thick, the plate B being bolted to one side of plate A, and plate C to the opposite side. The segments S are attached by bolts to plate A, and when first used fit upon the outer edge of plate B. The face side of the saw is flat and smooth, while upon the opposite side the plates and segments are cut away toward the outer edge, so as to present a smooth beveled surface, being of the full thickness of the plates only at the center of the flange.

Two or more plates of steel may be used in constructing my improved flange; but, so far as I am able to judge, thin plates are best adapted to accomplish the end in view—viz., a thin flange of sufficient strength and firmness to properly support the segments S.

Having thus described my invention, what I claim to have invented, and desire to secure by Letters Patent, is—

A saw-flange, as a new article of manufacture, composed of several plates of steel bolted together, as described, for the purpose of supporting the segments of a circular saw, substantially as set forth.

FRED. F. TAYLOR.

Witnesses:
EDWARD TAGGART,
OMAR H. SIMONDS.